(12) United States Patent
Schulz et al.

(10) Patent No.: US 9,860,092 B2
(45) Date of Patent: Jan. 2, 2018

(54) ASYMMETRIC CROSS-CONNECT SYSTEM

(71) Applicant: MICROSEMI STORAGE SOLUTIONS, INC., Aliso Viejo, CA (US)

(72) Inventors: Michael Schulz, Castrop-Rauxel (DE); Robert Bruck, Newbury Park, CA (US)

(73) Assignee: Microsemi Storage Solutions, Inc., Aliso Viejo, CA (US)

(*) Notice: Subject to any disclaimer, the term of this patent is extended or adjusted under 35 U.S.C. 154(b) by 0 days.

(21) Appl. No.: 15/480,804

(22) Filed: Apr. 6, 2017

(65) Prior Publication Data

US 2017/0302486 A1    Oct. 19, 2017

Related U.S. Application Data

(60) Provisional application No. 62/323,835, filed on Apr. 18, 2016.

(51) Int. Cl.
  *H03H 7/40*    (2006.01)
  *H04L 27/01*   (2006.01)

(52) U.S. Cl.
  CPC ................. *H04L 27/01* (2013.01)

(58) Field of Classification Search
  CPC ........ H04L 25/03038; H04L 25/03057; H03H 21/0012; H03H 21/0043; H04B 3/23
  USPC ......................... 375/232, 219; 708/322, 323
  See application file for complete search history.

(56) References Cited

U.S. PATENT DOCUMENTS 9,467,314 B1 * 10/2016 Wei ................. H04L 25/03057
2013/0142244 A1 * 6/2013 Tan ................. H04L 25/03012
                                                                 375/232

* cited by examiner

*Primary Examiner* — Khai Tran
(74) *Attorney, Agent, or Firm* — Simon Kahn

(57) ABSTRACT

An asymmetric cross-connect system, constituted of: a cross-connect circuitry; and a control circuitry, wherein the cross-connect circuitry comprises a plurality of adaptive equalizers and a plurality of fixed equalizers, wherein the plurality of adaptive equalizers are in electrical communication with a multi-purpose port of a user device and each of the plurality of fixed equalizers are in electrical communication with a respective output of a processor of the user device, and wherein the cross-connect circuitry is arranged, responsive to the control circuitry, to provide a communication path between one of the outputs the processor and the multi-purpose port.

8 Claims, 3 Drawing Sheets

*PRIOR ART*     FIG. 1C

ASYMMETRIC CROSS-CONNECT SYSTEM

TECHNICAL FIELD

The present invention relates to the field of cross-connectors, and in particular to a cross-connect system.

BACKGROUND OF THE INVENTION

Computers today have several different types of external ports, such as USB, HDMI, DVI, VGA and PCIe, in addition to one or more power jacks. This is cumbersome for use and also adds costs since many different ports are provided when only a portion of them are typically used simultaneously.

In order to overcome this problem, a multi-purpose connector, called a "Type C" connector has been developed, which allows for a single port type for all the different data and power connections. FIG. 1A illustrates a high level perspective view of a user device 10, comprising a plurality of multi-purpose ports 20; FIG. 1B illustrates a high level schematic diagram of a printed circuit board (PCB) 30 of user device 10, comprising a processor 40 and a cross-connect circuitry 50; and FIG. 1C illustrates a high level schematic diagram of cross-connect circuitry 50 in accordance with the prior art, FIGS. 1A-1C being described together. PCB 30 comprises: processor 40; cross-connect circuitry 50; and a control circuitry 60. Cross-connect circuitry 50 comprises: a transmultiplexer 55; a plurality of receivers 70; and a plurality of output drivers 80. Each receiver 70 comprises an adaptive equalizer 75. In one embodiment, multi-purpose ports 20 are each Type C ports. In another embodiment, adaptive equalizers 75 are each implemented as a continuous time linear equalizer (CTLE).

Each of a plurality of pins of processor 40 are coupled to a respective receiver 70 or output driver 80 of cross-connect circuitry 50, via lines 90, it being understood that line 90 is not a physical line but rather a communication channel of the meeting the appropriate definition. Particularly, each one, or set, of lines 90 are arranged to transmit data of a different type, e.g. USB, DisplayPort DP and PCIe. Each pin of each multi-purpose port 20 is coupled to a respective receiver 70 or output driver 80, it being understood that the term pin is meant to include any connection form for connection of electrical signals from inside the respective device to circuitry external of the respective device. An output of control circuitry 60 is coupled to a control input of transmultiplexer 55 and each of a plurality of inputs of control circuitry 60 is coupled to a respective one of the plurality of multi-purpose ports 20 (connections not shown for simplicity).

In operation, when a device is connected to a multi-purpose port 20, control circuitry 60 is arranged to identify the pins of processor 40 which are associated with the device and control cross-connect circuitry 50 to provide a path between the multi-purpose port 20 and the respective pins of processor 40. For example, if the device is a USB drive, control circuitry 60 detects the USB protocol. Control circuitry is further arranged to control transmultiplexer 55 to couple the receivers 70 and output drivers 80 which are coupled to the respective multi-purpose port 20 to the receivers 70 and output drivers 80 which are coupled to the lines 90 which are coupled to the USB pins of processor 40. Adaptive equalizers 75 of receivers 70 are arranged to equalize the transmitted signals to reduce noise. Particularly, adaptive equalizers 75 allow proper equalization even though different lengths of cables are used for connecting external devices to multi-purpose ports 20.

Unfortunately, having an adaptive equalizer 75 for every receiver 70 of cross-connect circuitry 50 consumes a large amount of power and significantly increases the size of cross-connect circuitry 50. The size increase and increased power consumption inhibits the introduction of multi-purpose ports 20 into computers, especially laptop computers.

What is desired, and not provided by the prior art, is a multi-purpose connector cross-connect system which is reduced in size and consumes less power.

SUMMARY OF THE INVENTION

Accordingly, it is a principal object of the present invention to overcome at least some of the disadvantages of the prior art. This is provided in one embodiment by a asymmetric cross-connect system, comprising: a cross-connect circuitry; and a control circuitry, wherein the cross-connect circuitry comprises a plurality of adaptive equalizers and a plurality of fixed equalizers, wherein the plurality of adaptive equalizers are in electrical communication with a multi-purpose port of a user device and each of the plurality of fixed equalizers are in electrical communication with a respective output of a processor of the user device, and wherein the cross-connect circuitry is arranged, responsive to the control circuitry, to provide a communication path between one of the outputs the processor and the multi-purpose port.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawing:

FIG. 1C illustrates a high level schematic diagram of the cross-connect circuitry of FIG. 1B, in accordance with the prior art;

DETAILED DESCRIPTION OF PREFERRED EMBODIMENTS

Figure 1A:
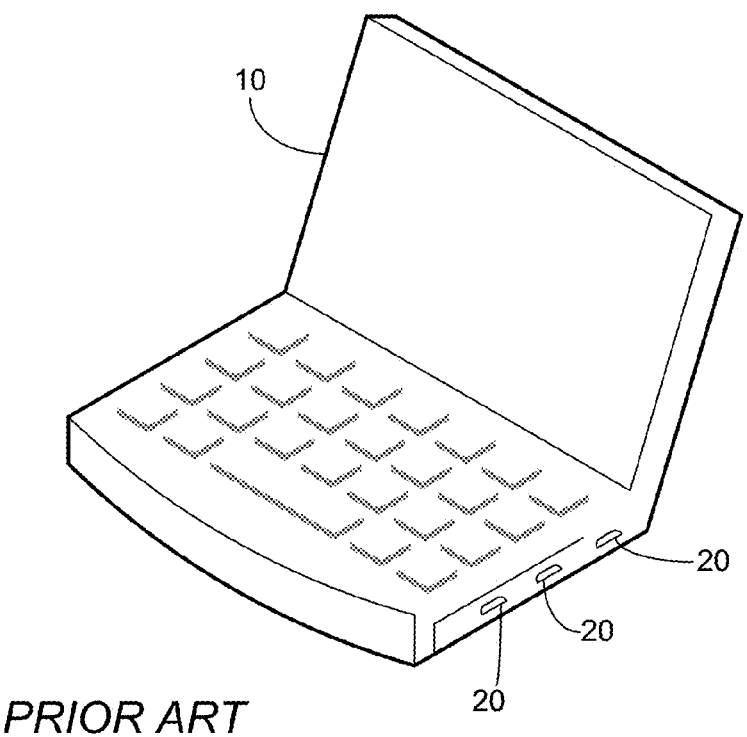
FIG. 1A illustrates a high level perspective view of a user device comprising a plurality of multi-purpose ports, in accordance with the prior art.
Figure 1B:
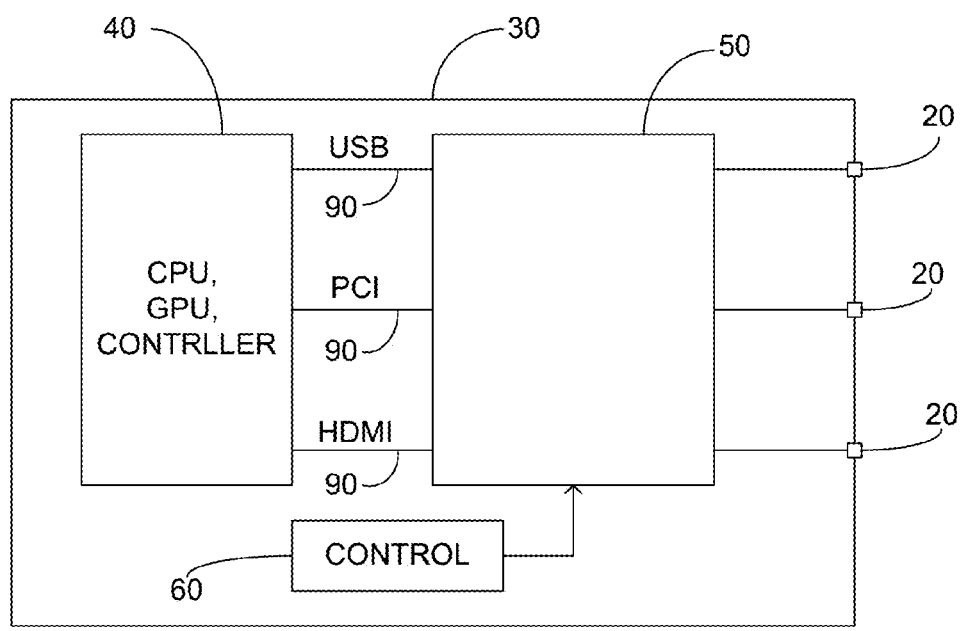
FIG. 1B illustrates a high level schematic diagram of a PCB of the user device of FIG. 1A, comprising a processor and a cross-connect circuitry, in accordance with the prior art.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. In particular, the term "coupled" as used herein is not meant to be limited to a direct connection, and allows for intermediary devices or components without limitation.

Figure 2A:
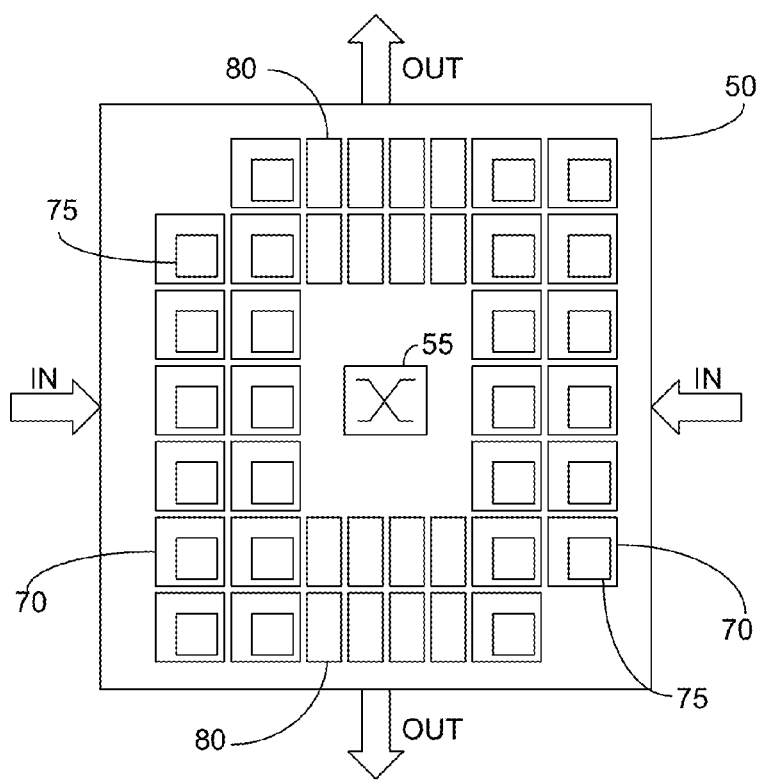
FIG. 2A illustrates a high level schematic diagram of a PCB of a user device, comprising a processor and a cross-connect circuitry, in accordance with certain embodiments.
Figure 2A:
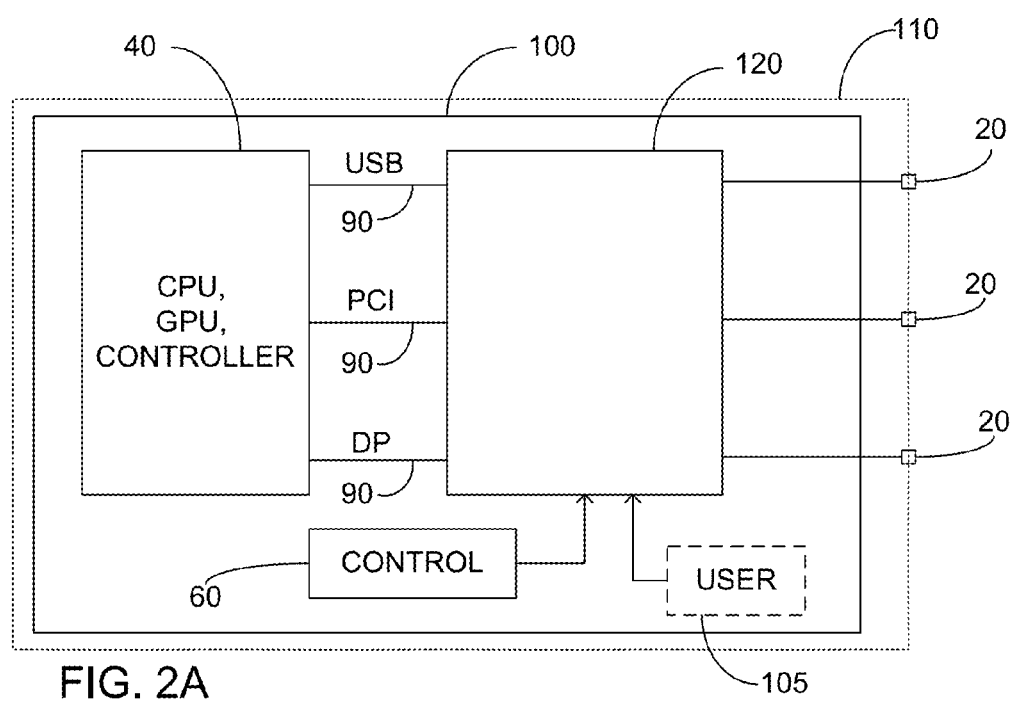
Figure 2B:
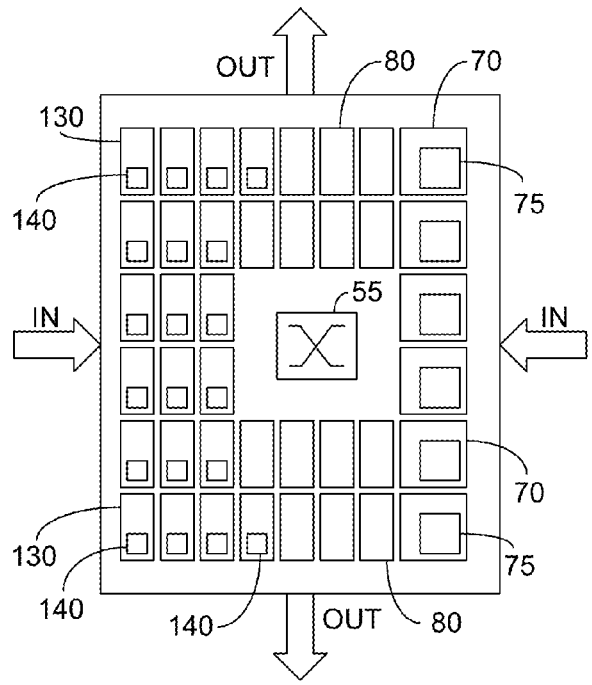
FIG. 2B illustrates a high level schematic diagram of a the cross-connect circuitry of FIG. 2A, in accordance with certain embodiments.

FIG. 2A illustrates a high level schematic view of a PCB 100 of a user device 110, PCB 100 comprising: a processor 40; a cross-connect circuitry 120; a control circuitry 60; and an optional user input module 105. FIG. 2B illustrates a high level schematic view of cross-connect circuitry 50, FIGS. 2A-2B being described together. User device 110 comprises: PCB 100; and a plurality of multi-purpose ports 20. Cross-connect circuitry 120 comprises: a transmultiplexer 55; a plurality of receivers 70; a plurality of receivers 130; and a plurality of output drivers 80. Each receiver 70 comprises an adaptive equalizer 75 and each receiver 130 comprises a fixed equalizer 140. The term 'fixed equalizer' is not meant to limit the equalizer to being an unprogrammable equalizer. Particularly, fixed equalizer 140 is non-adaptive but can be programmed at installation and adjusted responsive to a user input, as will be described below. In one embodiment, fixed equalizer 140 comprises a finite impulse response (FIR) filter. In one further embodiment, fixed equalizer 140 comprises a 2-tap FIR filter. In another embodiment, each multi-purpose port 20 comprises a Type C port.

Each of a plurality of pins of processor 40 are coupled to a respective receiver 130 or output driver 80 of cross-connect circuitry 120, via lines 90. Particularly, as described above, each one, or set, of lines 90 are arranged to transmit data of a different type, e.g. USB, DP and PCIe. Each of a plurality of multi-purpose ports 20 of user device 110 is coupled to a respective receiver 70 or output driver 80 of cross-connect circuitry 120. An output of control circuitry 60 is coupled to a control input of transmultiplexer 55 and each of a plurality of inputs of control circuitry 60 is coupled to a respective one of the plurality of multi-purpose ports 20 (connections not shown for simplicity). Optional user input module 105 is in communication with each of fixed equalizers 140. In one embodiment, optional user input module 105 is in communication with each of fixed equalizers via control circuitry 60. Optional user input module 105 is arranged to receive a user input responsive to a user gesture at an input device on user device 110 (not shown). In one embodiment (not shown) an emphasis system is provided between processor 40 and cross-connect circuitry 120 to provide emphasis to signals transmitted between processor 40 and cross-connect circuitry 120.

In operation, when a device is connected to a multi-purpose port 20, control circuitry 60 is arranged to identify the pins of processor 40 which are associated with the device and control cross-connect circuitry 120 to provide a communication path between the multi-purpose port 20 and the respective pins of processor 40. For example, if the device is an external driver, control circuitry 60 detects a PCI protocol. Control circuitry is further arranged to control transmultiplexer 55 to couple the receivers 70 and output drivers 80 which are coupled to the multi-purpose port 20 to the receivers 130 and output drivers 80 which are coupled to the lines 90 which are coupled to the PCI pins of processor 40.

Fixed equalizers 140 of receivers 130 are arranged to equalize the signals received from processor 40 and adaptive equalizers 75 of receivers 70 are arranged to equalize the signals received from multi-purpose port 20, to reduce noise. Particularly, adaptive equalizers 75 allow proper equalization even though different lengths of cables are used for connecting external devices to multi-purpose ports 20. Adaptive equalizers 75 are in one embodiment arranged to measure the frequency content of the incoming signal and adjust the equalization to automatically condition the incoming signal, as known to those skilled in the art at the time of the invention.

The distance between processor 40 and cross-connect circuitry 120 is fixed and known by the manufacturer of user device 110. Therefore, fixed equalizers 140 of cross-connect circuitry 120 can be programmed during installation, or at the design phase, to allow proper equalization of all signals received from processor 40. As described above, in one embodiment, each fixed equalizer 140 comprises a 2-tap FIR filter, i.e. a main tap and a delay tap. In one embodiment, the magnitude of each tap can be independently controlled via optional user input module 105. In another embodiment, optional user input module 105 is arranged to receive an input regarding desired amplitude and de-emphasis values for one or more fixed equalizers 140 and optional user input module 105 is arranged to determine the adjustments for the taps of the FIR filter to meet the desired amplitude and de-emphasis requirements. The taps of the respective fixed equalizers 140 are thus adjusted accordingly. In one embodiment, optional user input module 105 is further arranged to receive an input regarding a desired delay and the delay tap of the FIR filter is adjusted accordingly.

Since the distances of communication between processor 40 and fixed equalizers 140 are known and fixed, no adaptation needs to be done responsive to the incoming communication signals. Therefore, a simple filter can be used. Advantageously, fixed equalizers are significantly smaller, and consume significantly less power, than adaptive equalizers. As a result, cross-connect circuitry 120 is smaller, and consumes less power, than cross-connect circuitry 50 described above. Cross-connect circuitry 120 is thus asymmetric in nature, particularly as compared to cross-connect circuitry 50 described above.

Figure 3:
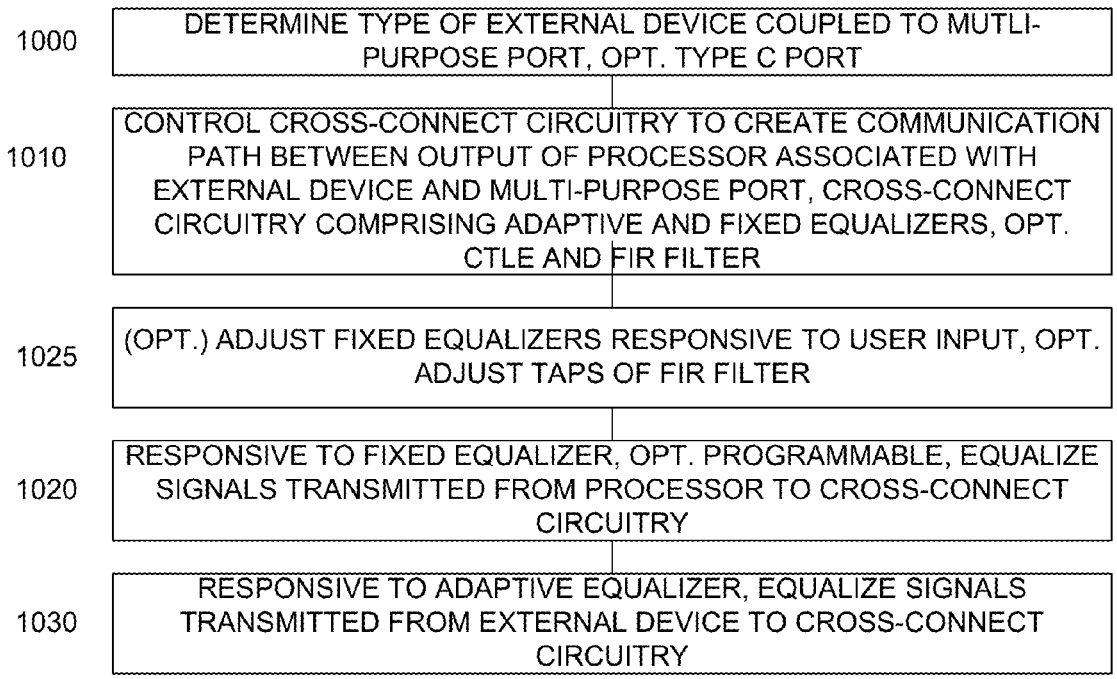
FIG. 3 illustrates a high level flow chart of a method of cross-connecting a processor of a user device with a multi-purpose port of the user device, in accordance with certain embodiments.

FIG. 3 illustrates a high level flow chart of a method of cross-connecting a processor of a user device with a multi-purpose port of the user device. In stage 1000, the type of an external device coupled to the multi-purpose port of the user device is determined. Optionally, the multi-purpose port is a Type C port. In stage 1010, a cross-connect circuitry is controlled to create a communication path between a particular output of the processor which is associated with the external device and the multi-purpose port. In stage 1020, a fixed equalizer is arranged to equalize signals transmitted from the processor to the cross-connect circuitry. Optionally, the fixed equalizer is programmable. Optionally, the fixed equalizer comprises an FIR filter. In optional stage 1025, the taps of the optional FIR filter of stage 1020 are adjusted responsive to a user input. In stage 1030, an adaptive equalizer is arranged to equalize signals transmitted from the external device to the cross-connect circuitry. Optionally, the adaptive equalizer comprises a CTLE.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described herein above. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

The invention claimed is:

1. An asymmetric cross-connect system, comprising: a cross-connect circuitry; and a control circuitry, wherein said cross-connect circuitry comprises a plurality of adaptive equalizers and a plurality of fixed equalizers, wherein said plurality of adaptive equalizers are each arranged for connection to a respective multi-purpose port of a user device and each of said plurality of fixed equalizers are arranged for connection to a respective output of a processor of the user device, and wherein said cross-connect circuitry is arranged, responsive to said control circuitry, to provide a communication path between a selected one of the outputs of the processor and a selected one of the multi-purpose ports of the user device.

2. The system of claim 1, wherein each of said adaptive equalizers comprises a continuous time linear equalizer and each of said fixed equalizers comprises a finite impulse response filter.

3. The system of claim 1, further comprising a user input module, each of said fixed equalizers arranged to be adjusted responsive to a respective user input at said user input module.

4. The system of claim 3, wherein each of said fixed equalizers comprises a finite impulse response filter, taps of said finite impulse response filter arranged to be adjusted responsive said respective user input.

5. A multi-purpose port cross-connecting method, the method comprising: determining the type of an external device coupled to a multi-purpose port of a user device; controlling a cross-connect circuitry to create a communication path between the multi-purpose port and a particular output of a processor which is associated with the external device, the cross-connect circuitry comprising a plurality of adaptive equalizers and a plurality of fixed equalizers; equalizing signals transmitted from the processor to the cross-connect circuitry with a respective one of the plurality of fixed equalizers; and equalizing signals transmitted from the external device to the cross-connect circuitry with a respective one of the plurality of adaptive equalizers.

6. The method of claim 5, wherein each of the adaptive equalizers comprises a continuous time linear equalizer and each of the fixed equalizers comprises a finite impulse response filter.

7. The method of claim 5, further comprising, responsive to a user input, adjusting a respective one of the plurality of fixed equalizers.

8. The method of claim 7, wherein each of the fixed equalizers comprises a finite impulse response filter, taps of said finite impulse response filter arranged to be adjusted responsive the respective user input.

* * * * *